(12) United States Patent
Forenz et al.

(10) Patent No.: US 10,131,034 B2
(45) Date of Patent: Nov. 20, 2018

(54) ABRASIVE JET FORMING LAMINATED GLASS STRUCTURES

(71) Applicant: Corning Incorporated, Corning, NY (US)

(72) Inventors: Dominick John Forenz, Hammondsport, NY (US); Mark Lee Humphrey, Elmira, NY (US); Walter Jay McKendrick, Painted Post, MN (US); Michael William Price, Corning, NY (US); Gregg Lee Shugars, Savona, NY (US)

(73) Assignee: Corning Incorporated, Corning, NY (US)

( * ) Notice: Subject to any disclaimer, the term of this patent is extended or adjusted under 35 U.S.C. 154(b) by 58 days.

(21) Appl. No.: 15/307,225

(22) PCT Filed: Apr. 29, 2015

(86) PCT No.: PCT/US2015/028111
§ 371 (c)(1),
(2) Date: Oct. 27, 2016

(87) PCT Pub. No.: WO2015/168196
PCT Pub. Date: Nov. 5, 2015

(65) Prior Publication Data
US 2017/0120420 A1 May 4, 2017

Related U.S. Application Data

(60) Provisional application No. 61/985,731, filed on Apr. 29, 2014.

(51) Int. Cl.
*B24C 1/04* (2006.01)

(52) U.S. Cl.
CPC .................................. *B24C 1/045* (2013.01)

(58) Field of Classification Search
CPC ....................................................... B24C 1/045
(Continued)

(56) References Cited

U.S. PATENT DOCUMENTS 2,793,478 A * 5/1957 Rohowetz ............ B23D 61/185
125/21
2,999,781 A * 9/1961 Davis ....................... H01J 9/50
156/153

(Continued)

FOREIGN PATENT DOCUMENTS

| CN | 1271646 | 11/2000 |
|---|---|---|
| CN | 1083763 | 5/2002 |

(Continued)

OTHER PUBLICATIONS

Notification of Transmittal of the International Search Report and Written Opinion of the International Searching Authority, or the Declaration, dated Apr. 29, 2015 pp. 1-15, International Application No: PCT/US2015/028111, European Patent Office, The Netherlands.

(Continued)

*Primary Examiner* — George Nguyen (57) ABSTRACT

A method of shaping a laminated glass structure comprising a flexible glass sheet having a thickness of no greater than about 0.3 mm laminated to a non-glass substrate by an adhesive layer is provided. The method includes cutting the laminated glass structure with an abrasive cutting jet including a pressurized cutting fluid and abrasive particles thereby forming a shaped laminated glass structure. A glass edge strength of a cut edge of the shaped laminated glass structure is at least about 20 MPa.

19 Claims, 8 Drawing Sheets

(58) Field of Classification Search
USPC .......................................................... 451/40
See application file for complete search history.

(56) References Cited

U.S. PATENT DOCUMENTS

| | | | |
|---|---|---|---|
| 3,338,696 A | 8/1967 | Dockerty | |
| 3,682,609 A | 8/1972 | Dockerty | |
| 3,737,294 A | 6/1973 | Dumbaugh | |
| 3,746,526 A | 7/1973 | Giffon | |
| 3,849,097 A | 11/1974 | Giffen | |
| 3,888,054 A | 6/1975 | Maselli | |
| 3,931,438 A | 1/1976 | Beall | |
| 4,102,664 A | 7/1978 | Dumbaugh | |
| 4,214,886 A | 7/1980 | Shay | |
| 4,243,719 A * | 1/1981 | Holmes | B32B 17/10 |
| | | | 156/106 |
| 4,287,018 A * | 9/1981 | Gulati | B24B 41/061 |
| | | | 216/26 |
| 4,513,543 A * | 4/1985 | Lawrenson | B24B 1/00 |
| | | | 428/209 |
| 4,826,508 A * | 5/1989 | Schwartz | B24D 3/002 |
| | | | 51/293 |
| 5,342,426 A | 8/1994 | Dumbaugh | |
| 5,559,060 A | 9/1996 | Gulati | |
| 5,800,231 A | 9/1998 | De Haas et al. | |
| 5,880,231 A | 3/1999 | Grubbs et al. | |
| 6,861,136 B2 | 3/2005 | Verlinden et al. | |
| 7,201,965 B2 | 1/2007 | Gulati | |
| 7,514,149 B2 | 4/2009 | Bocko | |
| 8,007,913 B2 | 8/2011 | Coppola | |
| 2004/0048548 A1 * | 3/2004 | Shepherd | B24C 1/045 |
| | | | 451/2 |
| 2006/0076105 A1 * | 4/2006 | Furui | B32B 43/003 |
| | | | 156/257 |
| 2006/0102276 A1 * | 5/2006 | deWitt | B24C 1/045 |
| | | | 156/250 |
| 2011/0081542 A1 | 4/2011 | Pilloy et al. | |
| 2012/0085211 A1 | 4/2012 | Liu et al. | |
| 2013/0303053 A1 | 11/2013 | Mase et al. | |

FOREIGN PATENT DOCUMENTS

| | | |
|---|---|---|
| CN | 102350661 | 2/2012 |
| EP | 2397257 A2 | 12/2011 |
| JP | 201132124 | 2/2011 |
| JP | 2011178614 | 9/2011 |
| JP | 5541449 | 5/2014 |
| JP | 201476516 | 5/2014 |
| KR | 10-1145904 | 10/2008 |
| KR | 2011107181 | 9/2011 |
| TW | 580485 | 11/1998 |
| WO | 2014035942 | 3/2014 |

OTHER PUBLICATIONS

English Translation of CN201580021634.8 First Office Action dated Feb. 28, 2018, China Patent Office, 15 Pgs.

* cited by examiner

ABRASIVE JET FORMING LAMINATED GLASS STRUCTURES

This application claims the benefit of priority under 35 U.S.C. § 371 of International Application No. PCT/US2015/028111 filed on Apr. 29, 2015, which claims the benefit of priority to U.S. Application No. 61/985,731 filed on Apr. 29, 2014, the content of each of which is incorporated herein by reference in its entirety.

FIELD

The present disclosure relates to glass-laminate structures and, more particularly, to abrasive jet forming of laminated glass structures.

BACKGROUND

Laminated glass structures may be used as components in the fabrication of various appliances, automobile components and architectural structures or electronic devices. For example, laminated glass structures may be incorporated as cover glass for various end products such as refrigerators, backsplashes, decorative glazing or televisions. However, it may be difficult to cut or otherwise shape the laminated glass structures using machining methods typically used in manufacturing environments without causing fractures in the glass layer given limitations of the machining methods that might be used and properties of the laminated glass structures. For example, many such machining methods are not used to cut glass, plastic or adhesives. Accordingly, there is a need for methods of shaping laminated glass structures that minimize effort and cost of glass laminate use and installation.

SUMMARY

One technique to improve the mechanical reliability of flexible glass is to laminate, or bond, the flexible glass to one or more laminate materials or substrates of unique structures. Flexible glass may be glass having a thickness of 300 microns or less, including but not limited to, 300, 275, 250, 225, 200, 190, 180, 170, 160, 150, 140, 130, 120, 110, 100, 90, 80, 70, 60, 50, 40, 30, 20, or 10 microns. Additionally, the flexible glass may have a thickness in a range of from 100 to 200 microns. Depending on the mechanical strength and impact resistance requirements of a laminated glass structure, as well as the expected bending stresses and direction of the intended application, a laminated glass structure can be designed to meet various mechanical requirements. When used properly, the laminated glass structures can offer improved mechanical reliability and impact resistance performance over unlaminated flexible glass.

Once the laminated glass structures are formed, it can become necessary to cut or otherwise shape them. To this end, methods of shaping the laminated glass structures are described herein where abrasive jet cutting apparatus are used to effectively cut the laminated glass structures to desired shapes while minimizing damage to the flexible glass sufficient to diminish edge strength below a predetermined amount and/or initiate radial or circumferential crack propagation. The laminated glass structures can be used, for example, as a backsplash for kitchen installation, wherein a larger laminated glass structure can be cut down to a preselected size using the abrasive jet cutting apparatus.

Additional features and advantages will be set forth in the detailed description which follows, and in part will be readily apparent to those skilled in the art from the description or recognized by practicing the disclosure as exemplified in the written description and the appended drawings. It is to be understood that both the foregoing general description and the following detailed description are merely exemplary of the disclosure, and are intended to provide an overview or framework to understanding the nature and character of the disclosure as it is claimed.

The accompanying drawings are included to provide a further understanding of principles of the disclosure, and are incorporated in and constitute a part of this specification. The drawings illustrate one or more embodiment(s), and together with the description serve to explain, by way of example, principles and operation of the disclosure. It is to be understood that various features of the disclosure disclosed in this specification and in the drawings can be used in any and all combinations. By way of non-limiting example the various features of the disclosure may be combined with one another according to the following aspects.

According to a first aspect, a method of shaping a laminated glass structure comprising a flexible glass sheet having a thickness of no greater than about 0.3 mm laminated to a non-glass substrate by an adhesive layer, the method comprises:

cutting the laminated glass structure with an abrasive cutting jet comprising a pressurized cutting fluid and abrasive particles thereby forming a shaped laminated glass structure;

wherein a glass edge strength of a cut edge of the shaped laminated glass structure is at least about 20 MPa.

According to a second aspect, there is provided the method of aspect 1, wherein the abrasive particles have an ISO/FEPA grit designation of at least 70.

According to a third aspect, there is provided the method of aspect 1 or aspect 2, comprising pressurizing the cutting fluid to at least about 17,000 psi.

According to a fourth aspect, there is provided the method of any one of aspects 1-3, wherein a nozzle forming the abrasive cutting jet has an inner diameter of about 0.2 mm to about 1.3 mm.

According to a fifth aspect, there is provided the method of any one of aspects 1-4, wherein a nozzle forming the abrasive cutting jet has an inner diameter of no more than about 0.5 mm.

According to a sixth aspect, there is provided the method of any one of aspects 1-5, comprising initially forming the abrasive jet at a location spaced from the laminated glass structure.

According to a seventh aspect, there is provided the method of any one of aspects 1-6, further comprising masking at least a part of a surface of the flexible glass sheet.

According to an eighth aspect, there is provided the method of any one of aspects 1-7, wherein the step of cutting the laminated glass structure with the abrasive cutting jet comprises cutting the laminated glass structure while submerged.

According to a ninth aspect, there is provided the method of any one of aspects 1-8 further comprising clamping the laminated glass structure between an engaging member and a surface prior to the cutting the laminated glass structure with the abrasive cutting jet.

According to a tenth aspect, there is provided the method of any one of aspects 1-9, wherein a grit size of the abrasive particles is no greater than 150% of the thickness of the flexible glass sheet.

According to an eleventh aspect, there is provided the method of any one of aspects 1-10, wherein the step of cutting the laminated glass structure with the abrasive cutting jet comprises piercing the laminated glass structure at a piercing location and cutting a hole around the piercing location using the abrasive cutting jet.

According to a twelfth aspect, there is provided the method of any one of aspects 1-11, wherein the step of cutting the laminated glass structure with the abrasive cutting jet comprises cutting at a rate of between about 20 mm/min and about 3500 mm/min.

According to a thirteenth aspect, a method of shaping a laminated glass structure comprising a flexible glass sheet having a thickness of no greater than about 0.3 mm laminated to a non-glass substrate by an adhesive layer, the method comprises:

cutting the laminated glass structure with an abrasive cutting jet comprising a pressurized cutting fluid and abrasive particles thereby forming a shaped laminated glass structure;

wherein a grit size of the abrasive particles is no greater than 150% of the thickness of the flexible glass sheet.

According to a fourteenth aspect, there is provided the method of aspect 13, wherein a glass edge strength of a cut edge of the shaped laminated glass structure is at least about 20 MPa.

According to a fifteenth aspect, there is provided the method of aspect 13 or aspect 14, wherein the abrasive particles have an ISO/FEPA grit designation of at least 70.

According to a sixteenth aspect, there is provided the method of any one of aspects 13-15, comprising pressurizing the cutting fluid to at least about 17,000 psi.

According to a seventeenth aspect, there is provided the method of any of aspects 13-16, wherein a nozzle forming the abrasive cutting jet has an inner diameter of no more than about 1.3 mm.

According to an eighteenth aspect, there is provided the method of any one of aspects 13-17, wherein a nozzle forming the abrasive cutting jet has an inner diameter of no more than about 0.5 mm.

According to a nineteenth aspect, there is provided the method of any one of aspects 13-18, comprising initially forming the abrasive jet at a location spaced from the laminated glass structure.

According to a twentieth aspect, there is provided the method of any one of aspects 13-19, further comprising masking at least a part of a surface of the flexible glass sheet.

According to a twenty-first aspect, there is provided the method of any one of aspects 13-20, wherein the step of cutting the laminated glass structure with the abrasive cutting jet comprises cutting the laminated glass structure while submerged.

According to a twenty-second aspect, there is provided the method of any one of aspects 13-21 further comprising clamping the laminated glass structure between an engaging member and a surface prior to the cutting the laminated glass structure with the abrasive cutting jet.

According to a twenty-third aspect, there is provided the method of any one of aspects 13-22, wherein the step of cutting the laminated glass structure with the abrasive cutting jet comprises piercing the laminated glass structure at a piercing location and cutting a hole around the piercing location using the abrasive cutting jet.

According to a twenty-fourth aspect, there is provided the method of any one of aspects 13-23, wherein the step of cutting the laminated glass structure with the abrasive cutting jet comprises cutting at a rate of between about 20 mm/min and about 3500 mm/min.

According to a twenty-fifth aspect, a method of shaping a laminated glass structure comprising a flexible glass sheet having a thickness of no greater than about 0.3 mm laminated to a non-glass substrate by an adhesive layer, the method comprises:

providing an abrasive jet cutting apparatus comprising a nozzle assembly comprising a nozzle having an inner diameter of about 0.2 to about 1.3 mm;

delivering pressurized fluid to the nozzle from a pressurized fluid source at a pressure of no less than about 17,000 psi;

delivering abrasive particles from an abrasive particle source to the pressurized fluid forming an abrasive cutting jet, the abrasive particles having a grit size no greater than 150% of the thickness of the flexible glass sheet; and cutting the laminated glass structure with the abrasive cutting jet thereby forming a shaped laminated glass structure.

According to a twenty-sixth aspect, there is provided the method of aspect 25, wherein a glass edge strength of a cut edge of the shaped laminated glass structure is at least about 20 MPa.

According to a twenty-seventh aspect, a laminated glass structure comprises:

a flexible glass sheet having a thickness of at most about 0.3 mm and a cut edge; and a non-glass substrate bonded to a surface of the flexible glass sheet;

wherein a glass edge strength of the cut edge of the flexible glass sheet is at least about 20 MPa.

According to a twenty-eighth aspect, there is provided the laminated glass structure of aspect 27, further comprising an adhesive layer that bonds the flexible glass sheet to the non-glass substrate.

According to a twenty-ninth aspect, there is provided the laminated glass structure of aspect 27 or aspect 28, further comprising a hole cut through the flexible glass sheet and the non-glass substrate, wherein the hole is at least partially defined by the cut edge.

According to a thirtieth aspect, there is provided the laminated glass structure of any one of aspects 27-29, wherein the cut edge comprises a straight line.

According to a thirty-first aspect, there is provided the laminated glass structure of any one of aspects 27-30, wherein the cut edge comprises a radius.

According to a thirty-second aspect, there is provided the laminated glass structure of any one of aspects 27-31, further comprising a beveled edge, wherein the non-glass substrate extends beyond the cut edge of the flexible glass sheet.

BRIEF DESCRIPTION OF THE DRAWINGS

These and other features, aspects and advantages of the present disclosure are better understood when the following detailed description of the disclosure is read with reference to the accompanying drawings, in which.

DETAILED DESCRIPTION

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used herein, the singular forms "a," "an" and "the" include plural referents unless the context clearly dictates otherwise. Thus, for example, reference to a "component" includes aspects having two or more such components, unless the context clearly indicates otherwise.

Although glass is an inherently strong material, its strength and mechanical reliability is a function of its surface defect or flaw size density distribution and the cumulative exposure of stress to the material over time. During an entire product life cycle, a laminated glass structure may be subjected to various kinds of static and dynamic mechanical stresses. Embodiments described herein generally relate to methods of cutting laminated glass structures using an abrasive jet cutting apparatus. Particular examples discussed herein relate to laminated glass structures where the non-glass substrate is a polymer and/or metal or metal alloy, such as stainless steel, aluminum, nickel, magnesium, brass, bronze, titanium, tungsten, copper, cast iron or a noble metal.

Figure 1:
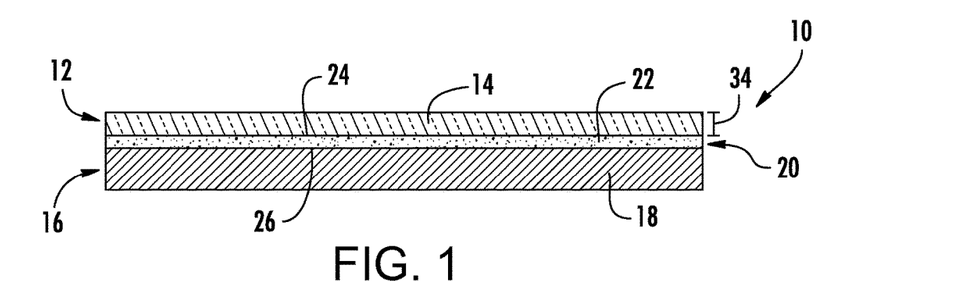
FIG. 1 illustrates a cross-sectional view of one embodiment of a laminated glass structure in accordance with aspects of the disclosure.

Referring to FIG. 1, a cross-sectional view of an exemplary laminated glass structure 10 is illustrated. The laminated glass structure 10 includes a flexible glass layer 12 that is formed of a flexible glass sheet 14 and a non-glass substrate layer 16 that is laminated to the flexible glass layer 12. The non-glass substrate layer 16 is formed of a non-glass substrate 18, such as polymer, wood or wood-based products (e.g., chipboard, particleboard, fiberboard, cardboard, hardboard, low pressure laminate, high pressure laminate, or veneer), metal or metal alloys (e.g., stainless steel, copper, nickel, brass, bronze, titanium, tungsten, cast iron, or aluminum), ceramic, composite, or another polymer or rigid material or combinations of these materials.

The non-glass substrate 18 may be formed using a polymer material, for example, any one or more of polyethylene teraphthalate (PET), polyethylene Naphthalate (PEN), ethylene tetrafluoroethylene (ETFE), or thermopolymer polyolefin (TPO™—polymer/filler blends of polyethylene, polypropylene, block copolymer polypropylene (BCPP), or rubber), polyesters, polycarbonate, polyvinylbuterate, polyvinyl chloride, polyethylene and substituted polyethylenes, polyhydroxybutyrates, polyhydroxyvinylbutyrates, polyetherimides, polyamides, polyethylenenaphalate, polyimides, polyethers, polysulphones, polyvinylacetylenes, transparent thermoplastics, transparent polybutadienes, polycyanoacrylates, cellulose-based polymers, polyacrylates and polymethacrylates, polyvinylalcohol, polysulphides, polyvinyl butyral, polymethyl methacrylate and polysiloxanes. It is also possible to use polymers which can be deposited/coated as pre-polymers or pre-compounds and then converted, such as epoxy-resins, polyurethanes, phenol-formaldehyde resins, and melamine-formaldehyde resins. Many display and electrical applications may prefer acrylic based polymers, silicones and such structural aiding layers, for example, commercially available SentryGlas® from DuPont. The polymer layers may be transparent for some applications, but need not be for other applications.

An adhesive layer 20 may be formed of an adhesive material 22 that may be used to laminate the flexible glass layer 12 to the non-glass substrate layer 16 at the interfaces between their respective broad surfaces 24 and 26. The adhesive material 22 may be a non-adhesive interlayer, an adhesive, a sheet or film of adhesive, a liquid adhesive (e.g., a hot melt adhesive), a powder adhesive, a pressure sensitive adhesive, an ultraviolet-light curable adhesive, a thermally curable adhesive, or other similar adhesive or combination thereof. The adhesive material 22 may assist in attaching the flexible glass 14 to the non-glass substrate 18 during lamination. Some examples of low temperature adhesive materials include Norland 68 cured by UV, Flexcon V29TT, 3M OCA 8211, 8212, 8146, and 8172 (bonded by pressure at room temperature), 3M 4905, OptiClear® adhesive, silicones, acrylates, optically clear adhesives, encapsulant material, polyurethane, polyvinylbutyrates, ethylenevinylacetates, ionomers, and wood glues. Typical graphic adhesives such as Graphicmount and Facemount may also be used (as available from LexJet Corporation, located in Sarasota, Fla., for example). Some examples of higher temperature adhesive materials include DuPont SentryGlas, DuPont PV 5411, Japan World Corporation material FAS and polyvinyl butyral resin. The adhesive layer 20 may be thin, having a thickness less than or equal to about 1000 µm, including less than or equal to about 500 µm, about 250 µm, less than or equal to about 50 µm, less than or equal to 40 µm, less than or equal to about 25 µm, or between about 0.1 mm and about 5 mm. The adhesives may also contain other functional components such as color, decoration, heat or UV resistance, AR filtration etc. The adhesive material 22 may be optically clear on cure, or may otherwise be opaque. In embodiments where the adhesive material 22 is a sheet or film of adhesive, the adhesive material 22 may have a decorative pattern or design visible through the thickness of the flexible glass, as shown in FIG. 2.

Figure 2:
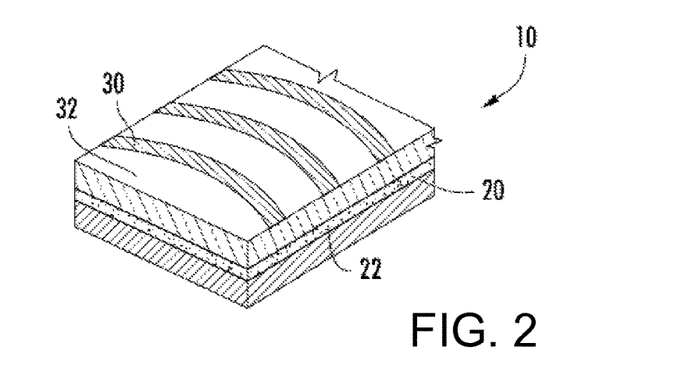
FIG. 2 depicts a cross-sectional view of the laminated glass structure of FIG. 1 with a decorative pattern located on one or more of the glass surface or upon a film located between the substrate and the flexible glass layer in accordance with aspects of the disclosure.

In FIG. 2, the laminated glass structure 10 includes an adhesive layer 20 formed of a sheet or film of adhesive material 22. The adhesive material 22 has a pattern of stripes 30 that are visible from an outer surface 32 of the flexible glass layer 12. In some embodiments, the non-glass substrate layer may provide a decorative pattern and/or the decorative pattern may be provided on either surface of the flexible glass sheet 14. In some embodiments, the decorative pattern may be provided on multiple layers 12, 16 and/or 20. Some air bubbles may become entrained in the laminated glass structure during or after lamination, but air bubbles having a diameter of equal to or less than 100 µm may not affect the impact resistance of the laminated glass structure. Formation of air bubbles may be reduced by use of a vacuum lamination system or application of pressure to a surface of the structure during lamination. In other embodiments, the flexible glass layer 12 may be laminated without adhesive.

The flexible glass sheet 14 may have a thickness 34 of about 0.3 mm or less including but not limited to thicknesses of, for example, about 0.01-0.05 mm, about 0.05-0.1 mm, about 0.1-0.15 mm, about 0.15-0.3 mm, about 0.100 to about 0.200 mm, 0.3, 0.275, 0.25, 0.225, 0.2, 0.19, 0.18, 0.17, 0.16, 0.15, 0.14, 0.13, 0.12, 0.11, 0.10, 0.09, 0.08 0.07, 0.06, 0.05, 0.04, 0.03, 0.02, or 0.01 mm. The flexible glass sheet 14 may be formed of glass, a glass ceramic, a ceramic material or composites thereof. A fusion process (e.g., downdraw process) that forms high quality flexible glass sheets can be used in a variety of devices and one such application is flat panel displays. Glass sheets produced in a fusion process have surfaces with superior flatness and smoothness when compared to glass sheets produced by other methods. The fusion process is described in U.S. Pat. Nos. 3,338,696 and 3,682,609. Other suitable glass sheet forming methods include a float process, updraw and slot draw methods. Additionally, the flexible glass sheet 14 may also contain anti-microbial properties by using a chemical composition for the glass including an Ag ion concentration on the surface in the range greater than 0 to 0.047 µg/cm$^2$, further described in U.S. Patent Application Publication No. 2012/0034435 A1. The flexible glass 14 may also be coated with a glaze composed of silver, or otherwise doped with silver ions, to gain the desired anti-microbial properties, as further described in U.S. Patent Application Publication No. 2011/0081542 A1. Additionally, the flexible glass 14 may have a molar composition of 50% $SiO_2$, 25% CaO, and 25% $Na_2O$ to achieve the desired anti-microbial effects.

Once the flexible glass sheet 14 is formed, it may be laminated to the non-glass substrate 18 using a variety of apparatus and processes. Some examples include sheet-to-sheet lamination where pressure and/or heat are used to bond the flexible glass sheet 14 to the non-glass substrate 18, for example, using the adhesive material 22. As another example, a roll-to-sheet or roll-to-roll lamination method may be used where; again, pressure is used to bond a continuous ribbon of flexible glass sheet 14 from a supply roll to a non-glass substrate 18 either as a continuous substrate from a supply roll or a plurality of individual substrates. While it may be possible to form the laminated glass structure to a final, desired dimension, it may be the case that some type of shaping (e.g., cutting) of the laminated glass structure will be needed after the laminated glass structure is formed. In these instances, the laminated glass structure may be referred to as a preform laminated glass structure in that the preform laminated glass structure will undergo final processing using an abrasive jet cutting apparatus.

Without wishing to be bound by theory, one difficulty that may be encountered during cutting of the laminated glass structures to a predetermined dimension is maintaining an acceptable edge quality of the flexible glass sheet 14. Edge quality of the flexible glass sheet 14 is related to edge strength and the possibility of initiation/formation of undesirable or unintended cracks and fractures in the flexible glass sheet 14. In some embodiments, it may be desirable to maintain a predetermined edge strength in the flexible glass sheet 14 after cutting. For example, maintaining an edge strength in the flexible glass sheet 14 of at least about 20 MPa, such as at least about 50 MPa or at least about 100 MPa can allow the flexible glass sheet 14 of the laminated glass structure 10 to survive end use conditions, such as handling and installation, without forming cracks and fractures in the flexible glass sheet 14. It has been found that, under predetermined conditions, abrasive jet cutting methods and equipment that are not typically used for cutting at least one of the materials in the laminated glass structure can be used to cut the laminated glass structures 10 (e.g., flexible glass sheet 14, adhesive material 22 and non-glass substrate 18), and, in some embodiments, with or without a subsequent edge finishing process can maintain a predetermined edge strength of at least about 20 MPa, such as at least about 50 MPa or at least about 100 MPa in the flexible glass sheets 14. Edge finishing of the laminated glass structures 10 using sand paper of greater grit designation may be employed to further improve the glass edge quality and strength.

Abrasive jet cutting is a process that can be used for piercing, cutting straight lines and precise, nonlinear shapes such as radius corners and holes in work pieces. The work pieces may be, for example, sheets of a material. As used herein, the term "cutting" may refer to removal of at least a portion of the target material and may include piercing of the target material as part of the cutting operation. As used herein, the term "piercing" may refer to an initial penetration of the target material by the abrasive jet. Laminated materials consisting of two or more layers of material joined together by an adhesive can present challenges during abrasive jet cutting. For example, liquid forced between the layers can tend to delaminate the layers by forcing them apart from each other. There may be a number of considerations to reduce the possibility of delamination when abrasive jet cutting laminated materials such as the strength of the bond and avoiding pierce points. If piercing is desired, relatively low cutting pressures may be used. In some instances, pre-drilled start holes may be provided in laminated materials that are to be pierced using an abrasive jet.

Abrasive jet cutting is typically not used to cut and produce holes in thin materials (e.g., 300 μm or less, such as 200 μm or less, such as 100 μm or less) due to relatively high cutting pressures used (e.g., about 17,000 to about 50,000 or more), which can crack or chip thin, brittle materials, particularly at pierce points. The abrasive jet cutting methods and apparatus described herein can be used to cut laminated glass structures that include a flexible glass sheet having a thickness of about 0.3 mm or less, as described above. The abrasive jet cutting methods may consist of only one step, cut completely though the laminated glass structure, produce a cut edge that is smooth in appearance and feel and/or produce an edge strength that is at least about 20 MPa as cut. The edge strength "as cut" may refer to the edge strength prior to subjecting the edge to a finishing process such as grinding or polishing. In some embodiments, however, a multi-step process may be used to obtain an acceptable edge quality on all of the materials of the laminated glass structure. In some embodiments, the non-glass substrate and flexible glass sheet may be cut separately using the same or different processes and the laminated glass structure may then be assembled. For example, the flexible glass sheet or the non-glass substrate may be cut using an abrasive jet cutting process and the other may be cut using a different process, which can include a different abrasive jet cutting process.

Figure 3:
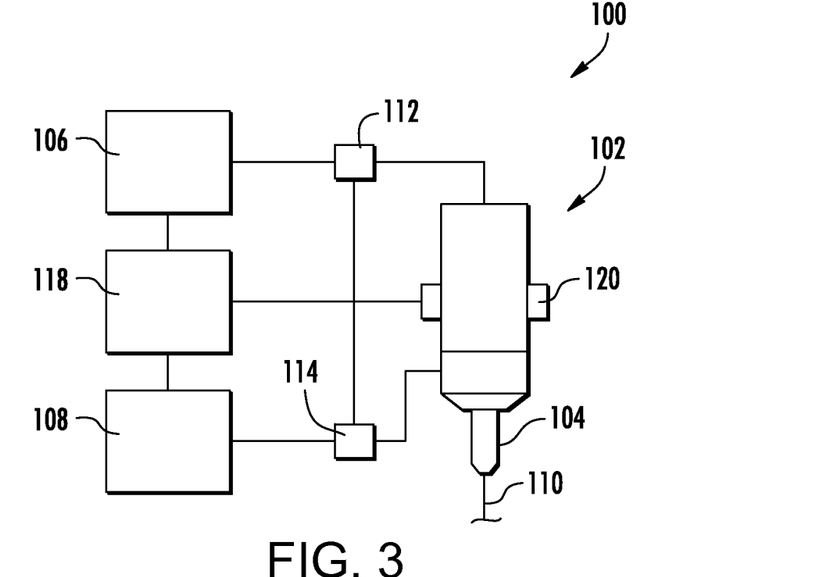
FIG. 3 depicts a diagrammatic view of an apparatus and method for shaping a laminated glass structure in accordance with aspects of the disclosure.

Referring to FIG. 3, an exemplary abrasive jet cutting apparatus 100 is illustrated schematically. As used herein, the term "abrasive jet" may refer to a jet formed by any suitable cutting fluid and includes any suitable abrasive material. In some embodiments, the cutting fluid includes water with or without an additive. Exemplary cutting fluids include water, liquid nitrogen, glycol, paraffin, oils (e.g., mineral oil, palm oil, vegetable oil), combinations thereof, etc. Exemplary abrasives include garnet, sugars, salts, ice particles, aluminum oxide, titanium oxide, baking soda, combinations thereof, etc. The abrasive jet cutting apparatus 100 includes a nozzle assembly 102 including a nozzle 104. The nozzle 104 inner diameter (e.g., between about 0.008 in and about 0.02 in) may be micro-sized (e.g., 0.008 in or less) or macro-sized (e.g., 0.01 in or more). The nozzle assembly 102 receives pressurized fluid from a pressurized fluid source 106 operatively connected thereto. An abrasive container 108 may be operatively connected to the nozzle assembly 102 for delivering abrasive particles thereto to be combined with the pressurized fluid to form an abrasive jet 110. Valves 112 and 114 may be provided for selectively allowing delivery of the pressurized fluid and abrasive particles to the nozzle assembly 102.

A controller 118 may be operatively connected to various components of the abrasive jet cutting apparatus 100 via wired or wireless connections. In the illustrated embodiment, the controller may be connected to the valves 112 and 114 for selectively opening and closing the valves 112 and 114. The controller 118 may also be connected to a bridge 120 or any other suitable drive system for controlling motion of the nozzle assembly 102, for example, up to 5-axes (e.g., such as 1, 2, 3, 4 and 5-axis). The controller 118 may also be connected to other components, such as the nozzle assembly 102, pumps and the pressurized fluid and abrasive sources 106 and 108. The controller 118 can include control software, firmware, and/or hardware for controlling components of the abrasive jet cutting apparatus 100. The controller 118 can include a processor, memory (e.g., ROM, RAM), storage media (e.g., hard drive, flash drive, etc.), user input devices (e.g., keyboard, mouse, touch-screen, etc.), output devices (e.g., displays, lights, etc.), input/output devices (e.g., network card, serial bus, etc.), an operating system (e.g., a Microsoft Windows operating system), and application programs and data. The controller 118 can include software for generating and/or importing Computer-Aided Design (CAD) drawings or other suitable drawings or information from which cutting or piercing operations can be derived.

Figure 4:
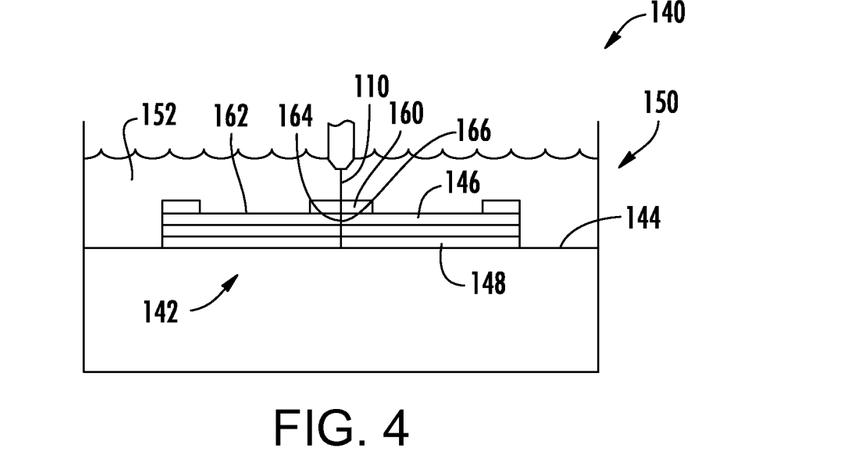
FIG. 4 depicts another diagrammatic view of the apparatus and method of FIG. 3 for shaping a laminated glass structure in accordance with aspects of the disclosure.

Referring to FIG. 4, a method 140 of abrasive jet cutting a preform laminated glass structure 102 using the abrasive jet cutting apparatus 100 is illustrated. A preform laminated glass structure 142 may be supported on a surface 144 of a support structure for a cutting process using the abrasive jet cutting apparatus 100 with a flexible glass sheet 146 of the preform laminated glass structure 142 facing away from the surface 144 of the support structure and a non-glass substrate 148 sandwiched between the flexible glass sheet 146 and the support surface 144. In some embodiments, the surface 144 may be part of or otherwise located within a catch tank 150 that catches the cutting fluid and abrasive particles. In some embodiments, the preform laminated glass structure 142 may be submerged in fluid 152 (e.g., water) for a submerged cutting operation, which tends to generate less noise and can reduce vibration, which can cause crack formation in the flexible glass sheet 146. In other embodiments, the preform laminated glass structure 142 may not be submerged in fluid 152. For example, the surface 144 may be positioned above the surface of fluid 152 (e.g., above the catch tank 150) so that the preform laminated glass structure 142 is positioned outside of the fluid.

Returning to FIG. 4, a mask 160 (e.g., a tape) may be applied to a broad surface 162 of the flexible glass sheet 146. As an example, the mask 160 may be strips of tape applied along an intended cutting line and/or at outer edges or other locations where clamps, weights, etc. may be applied to support the preform laminated glass structure 142 and inhibit vibration. The mask 160 can be used to protect the surface 162 and also to inhibit bonding and collection of glass chips along the cut edges 164 and 166 and on the surface 162. Where the mask 160 is applied can depend on a number of factors, such as the nozzle 104 used, where the preform laminated glass structure 142 is being supported and the final (or useful) laminated glass structure versus the scrap. In some embodiments, each piece of the preform laminated glass structure 142 may be useful, while in other embodiments, one or more pieces of the preform laminated glass structure 142 may be scrap. In some embodiments, both of the scrap portion and useful portion of the preform laminated glass structure 142 may be supported (e.g., using clamps, magnets, weights, etc.).

For a non-piercing cutting operation, the controller 118 can cause pressurized fluid and abrasive particles to be delivered to the nozzle assembly 102 and combined to produce an abrasive jet 170 delivered through the nozzle 104. Initially, the abrasive jet 170 may be initiated away from the preform laminated glass structure 142. In some embodiments, a water lag (e.g., 1-3 seconds) may be needed to allow the abrasive particles to be delivered to the pressurized fluid. A cut may be initiated in the preform laminated glass structure 142 as the abrasive jet 170 (e.g., at about 17,000 psi or greater, such as at about 30,000 psi or greater, such as at about 40,000 psi or greater, such as at about 50,000 psi or greater, such as at about 58,000 psi or greater, such as about 60,000 psi or greater) intersects an edge of the preform laminated glass structure 142 and is directed first onto the flexible glass sheet 146. As one micro-abrasive jet example, a nozzle diameter of 0.2 mm may be used with a 240 grit garnet abrasive particle. As one exemplary macro-abrasive example, a nozzle diameter of 0.3 mm may be used with a 320 grit garnet abrasive particle. The abrasive jet may have higher pressure when smaller nozzle sizes and/or finer abrasive particles are used. In some embodiments, it may be beneficial to use a lower pressure abrasive jet to avoid delamination that can be caused by fluid being forced between the flexible glass sheet and the non-glass substrate. In such embodiments, the abrasive jet may have a pressure of at most about 58,000 psi or at most about 30,000 psi. For example, the abrasive jet may have a pressure of about 58,000 psi when using a 0.3 mm nozzle and 120 grit Garnet abrasive particles. In another example, the abrasive jet may have a pressure of about 30,000 psi when using a 0.2 mm nozzle and 240 grit Garnet abrasive particles. In yet another example, the abrasive jet may have a pressure of about 58,000 psi when using a 0.045 in (1 mm) nozzle and 90 grit Garnet abrasive particles.

Cutting rates of between about 120 mm/minute and about 3500 mm/minute may be used. For example, the cutting rate may be about 1000 mm/minute or greater, such as about 1400 mm/minute or greater. Speed of cutting may be reduced about 20 percent to about 50 percent when cutting corners or radii in the preformed laminated glass structure 142. An amount in reduction of cutting rate can depend, at least in part, on the size of the radius being cut.

Figure 5:
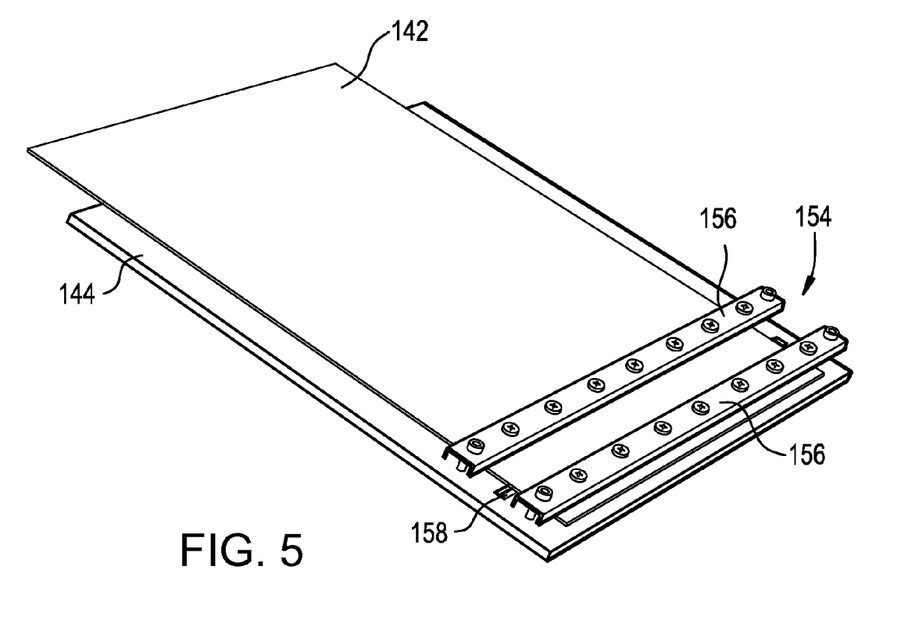
FIG. 5 depicts a diagrammatic view of an apparatus for securing a preform laminated glass structure in accordance with aspects of the disclosure.

Vibration control can prevent or reduce crack formation. For example, magnets may be used to fixture the preform laminated glass structures 142 to a magnetic backer plate. When a backer plate is not used, clamping may be used. In some embodiments, a suitable fixture may be used to fix the preform laminated glass structure 142 to the surface 144. FIG. 5 is a perspective view of one exemplary embodiment of a fixture 154 for securing the preform laminated glass structure 142 to the surface 144. The fixture 154 may include one or more engaging members 156 to engage the flexible glass sheet 146. For example, the fixture 154 shown in FIG. 5 includes two engaging members 156 configured as a pair of parallel bars. The engaging members 156 are secured to the surface 144 by suitable fasteners (e.g., screws). The preform laminated glass structure 142 may be positioned between the surface 144 and the engaging members 156 as shown in FIG. 5. The engaging members 156 are wider than the preform laminated glass structure 142 so that the engaging members extend beyond the edges of the laminated glass structure. The fasteners may be adjustable to adjust the distance between the engaging members 156 and the surface 144 so that the preform laminated glass structure 142 may be clamped onto the surface by tightening the fasteners. The clamping force should be sufficiently high to limit translation (e.g., movement in x and y directions) and vibration (e.g., movement in the z direction) and sufficiently low to avoid breaking the flexible glass sheet. In some embodiments, the engaging members can include a conformable material (e.g., rubber, neoprene, or another suitable material) in contact with the flexible glass sheet. Such a conformable material may help to dampen vibration and/or avoid damaging the flexible glass sheet. The preform laminated glass structure 142 may be positioned such that the intended cutting line is disposed between the engaging members 156 (e.g., in an opening between adjacent engaging members). In other embodiments, the engaging member can include an engaging sheet with an opening formed therein and aligned with the intended cutting line. The opening (e.g., the space between the engaging members 156 or the opening in the engaging sheet) should have a width that is sufficiently large to accommodate the fluid jet. For example, in some embodiments, the opening has a width of at least about 20 mm, such as about 50 mm. Additionally, or alternatively, the opening has a width of at most about 300 mm, such as about 150 mm. The width of the opening may depend on the material of the non-glass substrate. For example, the width of the opening may be at most about 150 mm for a PMMA substrate material or at most about 300 min for a steel substrate material. A wider opening may be suitable for a more rigid substrate material.

In some embodiments, the surface 144 includes an aperture 158, which can be positioned between the engaging members 156 (e.g., aligned with the opening between the adjacent engaging members). The preform laminated glass structure 142 may be positioned such that the aperture 158 is aligned with the intended cutting line as shown in FIG. 5. The aperture 158 may enable the fluid jet and/or cutting debris to flow through the surface 144 and away from the preform laminated glass structure 142 during cutting.

Another method for controlling vibration is to leave the useful part tabbed to a larger scrap work piece. The tabs can then be mechanically broken to release the useful part. A sanding operation may be employed, for example, using 180 grit or finer sand paper, such as 400 grit, (e.g., AlOx or SiC) on the tab attachment area to prevent any crack initiation sites from propagating in the flexible glass sheet 146.

Figure 6:
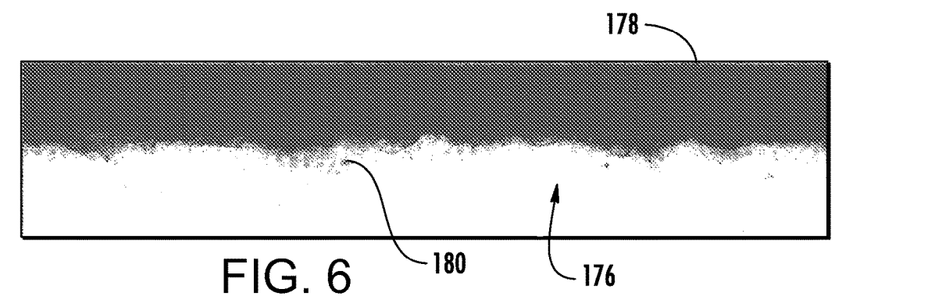
FIG. 6 illustrates a cut edge of a laminated glass structure formed in accordance with the method of FIG. 3 before finishing in accordance with aspects of the disclosure.
Figure 7:
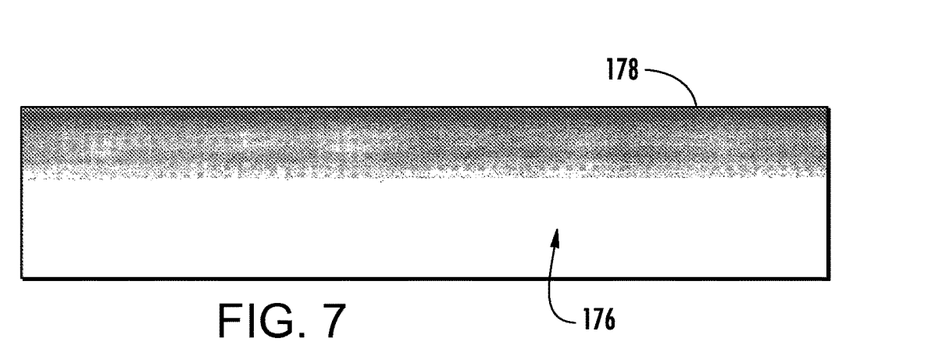
FIG. 7 illustrates the cut edge of FIG. 5 after finishing in accordance with aspects of the disclosure.
Figure 8:
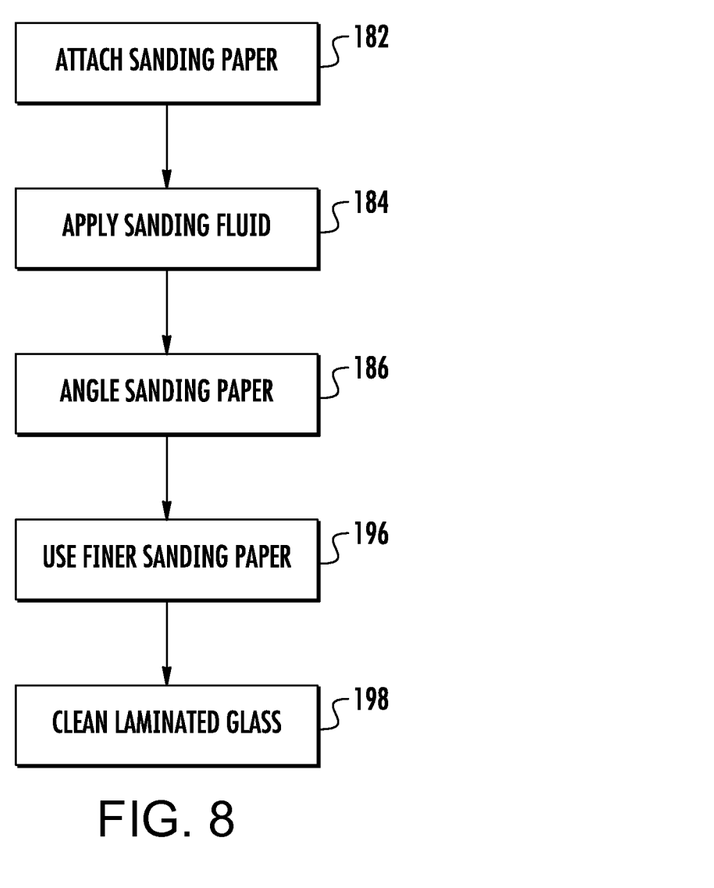
FIG. 8 illustrates a method of finishing a cut edge of a laminated glass structure in accordance with aspects of the disclosure.
Figure 9:
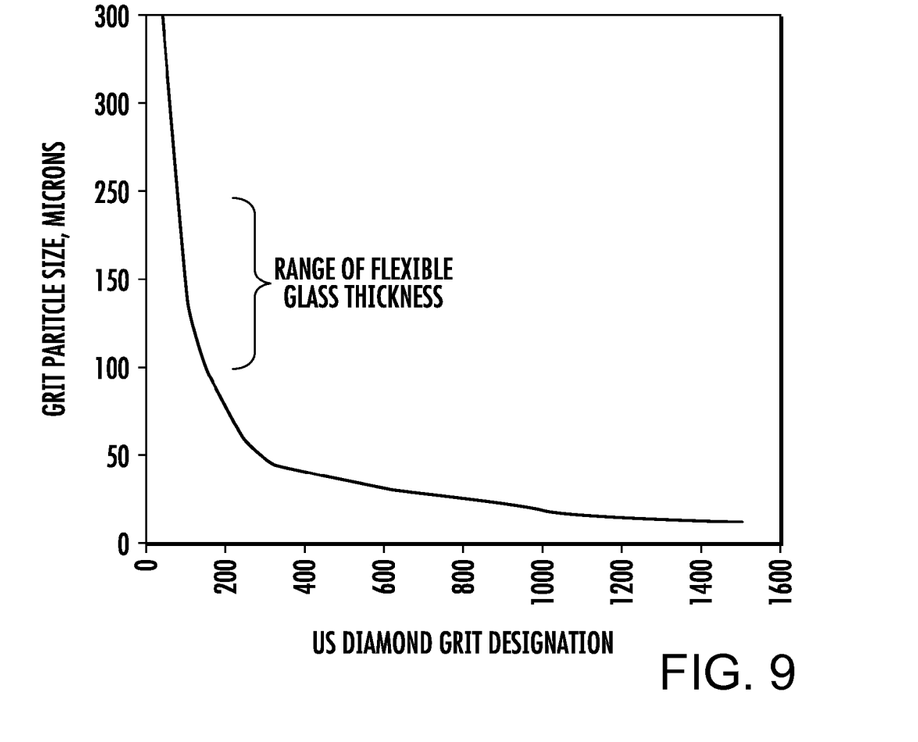
FIG. 9 illustrates a chart of grit particle size versus US diamond grit designation.

FIG. 6 illustrates a cut edge 176 of a flexible glass sheet 178 cut using an exemplary abrasive jet cutting process. Due to the cutting process, rounded and/or straight chips 180 may be created along the cut edge 176. In some embodiments, a finishing operation or multiple finishing operations may be desired to remove or reduce the size of the chips 180 and create a smoother or cleaner cut edge 176 (FIG. 7). Referring to FIG. 8, at step 182, a suitable sand paper (e.g., AlOx, SiC; at least 180 grit or finer, such as 400 grit) is attached to a sanding block. Referring briefly to FIG. 9, a chart comparing grit size to flexible glass sheet thickness and grit size is illustrated. As used herein, the term "grit size" may refer to the ISO/FEPA grit designation and to the corresponding average particle size. To minimize glass edge chipping during either a cutting or finishing operation, the grit size used should be no greater than 150% of the thickness of the flexible glass sheet. For example, the grit size may be much smaller than the thickness of the flexible glass sheet to produce any chip sizes less than a predetermined depth (e.g., about 20 μm or less). In some embodiments, grit sizes of 600 or finer, such as 800 or finer may be used. As shown in FIG. 9, when a flexible glass thickness of 100 to 200 microns is used, a grit size of 600 produces a grit particle size of less than 50 microns, i.e., about 30 microns and much smaller than the thickness of the flexible glass. For example, using abrasive particles during the cutting process having an average diameter of less than about ¼, such as less than about ⅕ of the thickness of the flexible glass sheet can significantly reduce edge chipping and obtain glass edge strengths of about 20 MPa or more, such as about 50 MPa or more, such as about 100 MPa or more.

Figure 10:
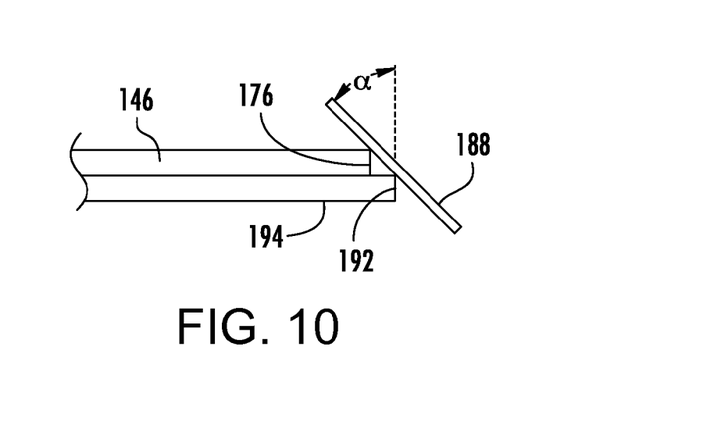
FIG. 10 illustrates a method of sanding a cut edge of a laminated glass structure in accordance with aspects of the disclosure.

Referring back to FIG. 8, at step 184, a fluid, such as water may be applied along the cut edge 176. At step 186, the sand paper and sanding block may be held at an angle to the cut edge 176 (i.e., at an angle to a plane transverse to the broad surface of the flexible glass sheet). FIG. 10 illustrates the sand paper 188 contacting the cut edge 176 at angle α to the cut edge 176 (e.g., between about one and about 45 degrees, such as between about one and about twenty degrees). Such an arrangement can produce the edge 176 of the flexible glass sheet 146 offset inwardly of the edge 192 of the non-glass substrate 194 and can provide some protection for the edge 176, for example, during handling by extending the edge 192 beyond the edge 176. In some embodiments, a beveled edge with the edge 176 of the flexible glass sheet 146 offset inwardly of the edge 192 of the non-glass substrate 194 can be formed during cutting itself by angling the abrasive jet offset from vertical (e.g., using a 5-axis cutting apparatus). Referring back to FIG. 8, once the initial sanding operation is complete using the 400 grit sand paper, finer grit sand paper (800 grit) may be used at the same angle α for a finishing operation at step 196. At step 198, the laminated glass structure may be rinsed and dried. Vibratory, belt or disc sanders may be used in a fashion similar to that described above.

Figure 11:
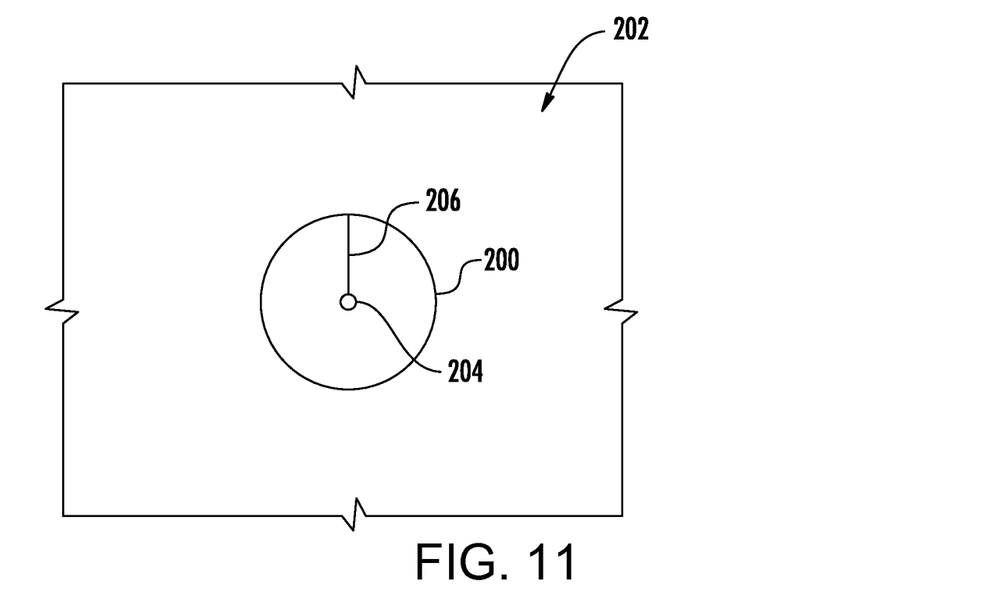
FIG. 11 illustrates another method for shaping a laminated glass structure in accordance with aspects of the disclosure.

Referring now to FIG. 11, various non-linear cuts can be made using the abrasive jet cutting processes described above. For example, FIG. 11 illustrates a method of cutting a round hole (represented by cut line 200) though a preform laminated glass structure 202 including a flexible glass sheet laminated to a non-glass substrate using an adhesive as described above. The preform laminated glass structure 202 may be pierced using the abrasive jet at a pierce location 204. During initial piercing the flexible glass sheet may crack or chip, which can then be cut away during hole formation. Once pierced, the abrasive jet can be moved radially (e.g., along cut line 206) to the desired hole diameter. Then a perimeter cut can be made along circular cut line 200. Holes of greater than about 4 mm in diameter, such as about 7 mm or more can be formed with the pierce location located at or near the center of the desired hole. The damage and the extent of the damage zone from the initial piercing can vary depending on the amount of flexure in the preform laminated glass structure from the water pressure. Minimal flexure can produce pierce damage of about 0.02 inch from the center of the pierce. Any secondary finishing required is dependent, at least in part, upon the cut and feed rate. Some cuts may require no secondary finishing while others may require a single step SiC or AlOx sanding or other type of finishing. Any minor cracking or large glass chipping that may occur during cutting can often be minimized with process parameter changes. However, a lower limit for small holes can be in the 4 to 7 mm diameter range, depending on the cutting process.

Figure 12:
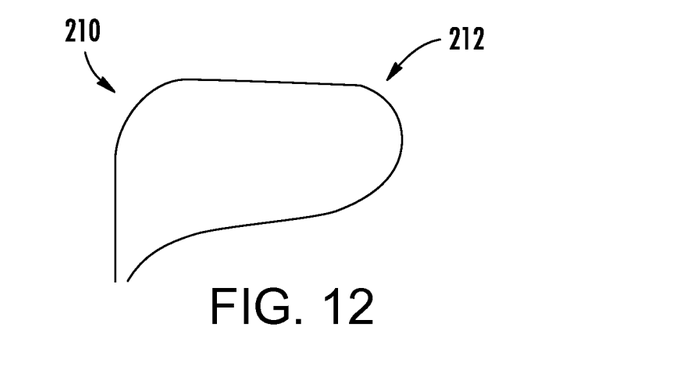
FIG. 12 illustrates another method of shaping a laminated glass structure in accordance with aspects of the disclosure.
Figure 13:
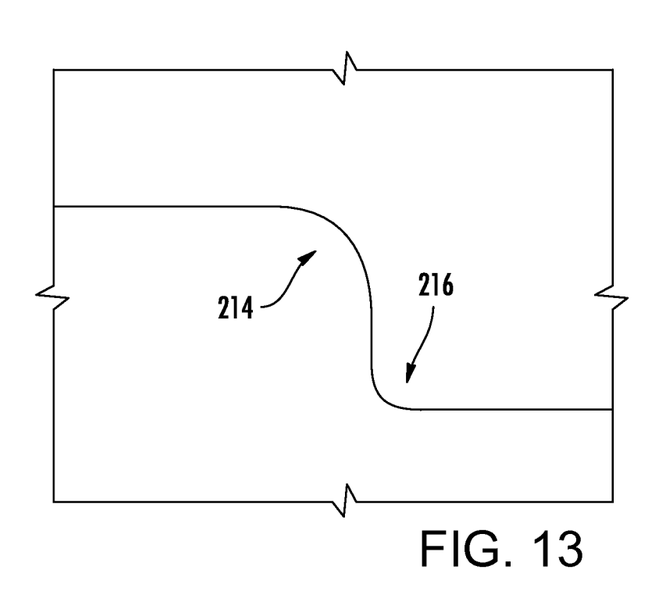
FIG. 13 illustrates another method of shaping a laminated glass structure in accordance with aspects of the disclosure.
Figure 14:
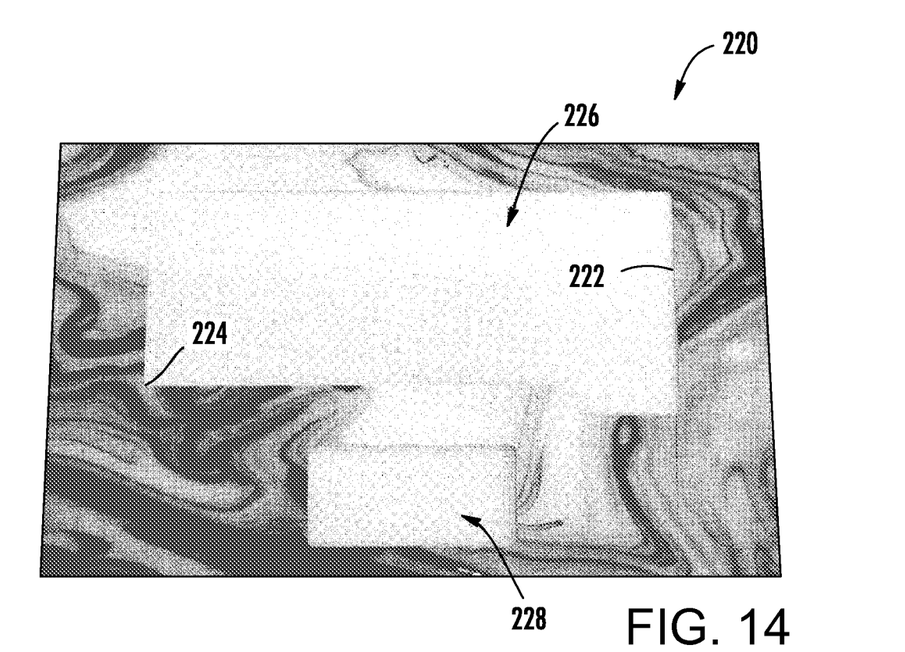
FIG. 14 illustrates a decorated laminated glass structure that includes a number of straight line cuts and radius corners in accordance with aspects of the disclosure.

Referring to FIGS. 12 and 13, different radius cuts are illustrated. In FIG. 12, a radiused corner 210 is provided using the abrasive jet cutting process for a preform laminated glass structure 212. In FIG. 13, a non-linear cut having a first, larger radius 214 (e.g., 4 mm) and a second, smaller radius 216 (e.g., 2 mm) is illustrated. In FIG. 14, a decorated laminated glass structure 220 is illustrated that includes a number of straight line cuts 222, radius corners 224 and opening or holes 226 and 228. In this example, the decorated laminate glass structure 220 may be formed as a laptop keyboard surround. A variety of circles, squares, rectangles and customized shapes can be cut within the laminated glass structures, for example, to serve as a backsplash for a variety of objects, such as electric outlet boxes.

The macro-abrasive jet and micro-abrasive jet methods and apparatus can be used to shape laminated glass structures and produce cut edges with the desired edge strength in a manufacturing setting. The processes and process parameters described herein can be suitable for making straight or curved cuts in laminated glass structures and holes in these laminated glass structures that are greater than about 4 mm in diameter. The preferred combination of techniques that can provide successful cutting and hole formation of laminated glass structures can include one or more of:

a. Masking the flexible glass surface (e.g., along an intended cutting line) with static cling tape, vinyl or adhesive tapes such as painter's tape or electrical panel floor tape to increase the precision of the edge cuts and to prevent particle adhesion to the glass.

b. Cutting while the laminate is submerged in water or securing the laminate in a suitable fixture to reduce vibrations that cause cracking, glass chipping, and particle adhesion to the glass surface.

c. Using the following nozzle and grit sizes to minimize glass edge chipping: Micro-Water Jet (nozzle diameter 0.2 mm or 0.008 inch, 240 grit garnet) and Macro-Water Jet (nozzle diameter 1.3 mm, 90 grit garnet). In some embodiments, micro-water jet nozzles can be used without any secondary finishing operation to provide cut edge strengths (e.g., as cut edge strength) of no less than about 20 MPa, such as 50 MPa or 100 MPa.

d. Using a grit size less than 150% of the thickness of the glass in order to produce a higher quality edge. The maximum grit size may be in the range of about 90 to about 400, such as about 180 to about 400, about 240 to about 320 grit, or about 75 to about 50 μm in particle size. Grit sizes of 800 to 1200 for the abrasive cutting jet may be used; however, nozzle clogging and grit clumping issues increase with increasing grit size.

e. Using a cutting path for holes to minimize cracking and chipping which begins by piercing the material in the geometric center of the hole to be cut, moving outward in a straight line or spiral pattern to the final radius of the hole, and then cutting the shape of the hole along its perimeter f. Using a cutting speed for straight lines and corners of approximately 84 mm/min and 20 mm/min respectively to minimize glass cracking at the corners.

g. Setting a 1.5 sec lag between the start of pumping the garnet slurry to the start of pumping the water to minimize chipping and cracking at the edge of the resulting hole.

h. Using tabs or a support plate to minimize cracking that can be left when the last bit of glass is cut for a hole i. Using grit sizes in the 75 to 50 μm range, the glass chip target size of less than about 20 μm can be achieved.

Use of the abrasive jet cutting processes and apparatus may have one or more of the following advantages. The ability to cut/trim laminates in one pass may be provided at higher speeds (e.g., between about 20 mm/min and 3500 mm/min). The abrasive jet cutting may be performed glass side up and masked which can reduce ancillary damage to the glass side of the laminated glass structures. Micro jet cutting can cut a laminate without secondary cutting or finishing steps such as sanding due to minimal glass chipping. The above described abrasive jet cutting can be suitable for manufacturing, i.e., mass production. Straight cuts, curves, holes and other non-linear shapes can be cut using abrasive jet cutting. All of the laminated layers may be cut through using the abrasive jet at the same time and relatively large sizes can be cut (e.g., 24×39 inches (600× 1000 mm)) and larger. The abrasive jet cutting methods may allow for fast prototype production and can provide high positioning accuracy (0.0001 in. (0.003 mm)), high contouring accuracy (+/−0.0004 in (0.01 mm)), high material usage due to small kerf 0.0118 in. (0.3 mm)/min and low cutting forces (load) in the case of the micro water jet technique. The abrasive jet cutting techniques may provide little, if any, thermal impact (heat), which could melt or burn the adhesive and causes little, if any, change in material structure as in the case of laser cutting.

It should be emphasized that the above-described embodiments of the present disclosure, including any embodiments, are merely possible examples of implementations, merely set forth for a clear understanding of various principles of the disclosure. Many variations and modifications may be made to the above-described embodiments of the disclosure without departing substantially from the spirit and various principles of the disclosure. All such modifications and variations are intended to be included herein within the scope of this disclosure and the present disclosure and protected by the following claims.

What is claimed is:

1. A method of shaping a laminated glass structure comprising a flexible glass sheet having a thickness of no greater than about 0.3 mm laminated to a non-glass substrate by an adhesive layer, the method comprising:
   positioning the flexible glass sheet proximate to an abrasive cutting jet such that the flexible glass sheet faces the abrasive cutting jet;
   cutting the laminated glass structure with the abrasive cutting jet comprising a pressurized cutting fluid and abrasive particles thereby forming a shaped laminated glass structure;
   wherein a compressive strength of a cut edge of the flexible glass sheet is at least about 20 MPa.

2. The method of claim 1, wherein the abrasive particles have an ISO/FEPA grit designation of at least 70.

3. The method of claim 1 comprising pressurizing the cutting fluid to at least about 17,000 psi.

4. The method of claim 1, wherein a nozzle forming the abrasive cutting jet has an inner diameter of about 0.2 mm to about 1.3 mm.

5. The method of claim 1 comprising initially forming the abrasive jet at a location spaced from the laminated glass structure.

6. The method of claim 1 further comprising masking at least a part of a surface of the flexible glass sheet.

7. The method of claim 1, wherein the step of cutting the laminated glass structure with the abrasive cutting jet comprises cutting the laminated glass structure while submerged.

8. The method of claim 1, wherein a grit size of the abrasive particles is no greater than 150% of the thickness of the flexible glass sheet.

9. The method of claim 1, wherein the step of cutting the laminated glass structure with the abrasive cutting jet comprises cutting at a rate of between about 20 mm/min and about 3500 mm/min.

10. A method of shaping a laminated glass structure comprising a flexible glass sheet having a thickness of no greater than about 0.3 mm laminated to a non-glass substrate by an adhesive layer, the method comprising:
    cutting the laminated glass structure with an abrasive cutting jet comprising a pressurized cutting fluid and abrasive particles thereby forming a shaped laminated glass structure;
    wherein the flexible glass sheet faces the abrasive cutting jet thereby exposing the flexible glass sheet to the abrasive cutting jet;
    wherein a grit size of the abrasive particles is no greater than 150% of the thickness of the flexible glass sheet.

11. The method of claim 10, wherein a compressive strength of a cut edge of the flexible glass sheet is at least about 20 MPa.

12. The method of claim 10, wherein the abrasive particles have an ISO/FEPA grit designation of at least 70.

13. The method of claim 10 comprising pressurizing the cutting fluid to at least about 17,000 psi.

14. The method of claim 10, wherein a nozzle forming the abrasive cutting jet has an inner diameter of about 0.2 mm to about 1.3 mm.

15. The method of claim 10, wherein the step of cutting the laminated glass structure with the abrasive cutting jet comprises cutting the laminated glass structure while submerged.

16. The method of claim 10, wherein the step of cutting the laminated glass structure with the abrasive cutting jet comprises cutting at a rate of between about 20 mm/min and about 3500 mm/min.

17. A laminated glass structure, comprising:
    a flexible glass sheet having a thickness of at most about 0.3 mm and a cut edge formed by an abrasive cutting jet; and
    a non-glass substrate bonded to a surface of the flexible glass sheet;
    wherein a compressive strength of the cut edge of the flexible glass sheet is at least about 20 MPa.

18. The laminated glass structure of claim 17 further comprising a hole cut through the flexible glass sheet and the non-glass substrate, wherein the hole is at least partially defined by the cut edge.

19. The laminated glass structure of claim 17 further comprising a beveled edge, wherein the non-glass substrate extends beyond the cut edge of the flexible glass sheet.

* * * * *